United States Patent
Xu et al.

(10) Patent No.: US 11,542,405 B2
(45) Date of Patent: Jan. 3, 2023

(54) AQUEOUS COATING COMPOSITION

(71) Applicants: Dow Global Technologies LLC, Midland, MI (US); Rohm and Haas Company, Collegeville, PA (US)

(72) Inventors: Yawei Xu, Shanghai (CN); Yujiang Wang, Shanghai (CN); Jinyuan Zhang, Shanghai (CN); Xiangting Dong, Shanghai (CN); Ling Li, Louyang (CN); Fengzhe Shi, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 292 days.

(21) Appl. No.: 16/634,204

(22) PCT Filed: Jul. 27, 2017

(86) PCT No.: PCT/CN2017/094613
§ 371 (c)(1),
(2) Date: Jan. 27, 2020

(87) PCT Pub. No.: WO2019/019077
PCT Pub. Date: Jan. 31, 2019

(65) Prior Publication Data
US 2021/0102087 A1    Apr. 8, 2021

(51) Int. Cl.
| | | |
|---|---|---|
| *C09D 133/08* | (2006.01) | |
| *C09D 133/02* | (2006.01) | |
| *C09D 143/04* | (2006.01) | |
| *C08K 3/105* | (2018.01) | |
| *C08K 3/36* | (2006.01) | |
| *C08F 220/18* | (2006.01) | |

(52) U.S. Cl.
CPC ...... *C09D 133/08* (2013.01); *C08F 220/1808* (2020.02); *C09D 133/02* (2013.01); *C09D 143/04* (2013.01); *C08K 3/105* (2018.01); *C08K 3/36* (2013.01)

(58) Field of Classification Search
CPC ............ C08F 220/1808; C09D 133/08; C09D 133/02; C09D 143/04; C08K 3/105; C08K 3/36

USPC ........................................................ 524/547
See application file for complete search history.

(56) References Cited

U.S. PATENT DOCUMENTS

| | | | |
|---|---|---|---|
| 4,243,430 | A | 1/1981 | Sperry et al. |
| 4,571,415 | A | 2/1986 | Jordan, Jr. |
| 4,980,411 | A | 12/1990 | Beckerle et al. |
| 6,184,281 | B1 | 2/2001 | Craun et al. |
| 9,303,183 | B1 | 4/2016 | Greer |
| 2002/0146515 | A1* | 10/2002 | Schwartz ............... B05D 7/542 427/407.1 |
| 2009/0026872 | A1 | 1/2009 | Tomohara et al. |
| 2009/0230345 | A1 | 9/2009 | Saija et al. |

FOREIGN PATENT DOCUMENTS

| | | | |
|---|---|---|---|
| AU | 198167974 | A | 3/1980 |
| AU | 198167974 | A1 * | 3/1980 |
| CN | 102056998 | A | 5/2011 |
| CN | 101486863 | B | 12/2012 |
| CN | 102120902 | B | 12/2012 |
| CN | 104327657 | A | 2/2015 |
| EP | 157133 | A1 | 10/1985 |
| EP | 2641922 | A1 | 9/2013 |
| JP | S62250078 | A | 10/1987 |
| JP | 2000273357 | A | 10/2000 |
| JP | 2014043589 | A | 3/2014 |

OTHER PUBLICATIONS

Supplementary European Search Report for the corresponding European Application No. 17918904.8, dated: Mar. 17, 2021; 6 pages.
Japanese Search Report for the corresponding Japanese Application No. 2020-503706; dated Jan. 7, 2021; 18 pages (English translation).

* cited by examiner

Primary Examiner — Kelechi C Egwim
(74) Attorney, Agent, or Firm — Karl E. Stauss; Cantor Colburn LLP

(57) ABSTRACT

An aqueous coating composition having a long pot life, a process for preparing such coating composition, and a method of preparing coatings having good adhesion to a substrate.

10 Claims, No Drawings

AQUEOUS COATING COMPOSITION

FIELD OF THE INVENTION

The present invention relates to an aqueous coating composition and a process for preparing the same.

INTRODUCTION

Water-based coating compositions (also known as aqueous coating compositions) may be formulated using aqueous dispersions of polymer latex as binders. Upon mixing the binder with other ingredients, the resultant coating compositions are desirable to have a pot life sufficient long for easy handling during application. After application coating compositions to a substrate, the aqueous carrier evaporates, and the individual latex particles coalesce to form an integral coating film. Some applications require relatively thick coating films. For example, filler-rich coatings, especially with large filler particles (e.g., about 90-600 μm) typically have a thickness of more than 2 mm. These thick coating films usually need several hours or even days for water evaporation and film strength build up at room temperature. Curing water-based coating compositions at high temperature (70-120° C.) is a conventional approach to speed up curing for prefabricated coatings done in big batches with industrial equipment. However, after high-temperature curing, conventional aqueous coating compositions tend to form thick coating films with bubbles and thus have poor adhesion to the substrate.

CN102120902(B) relates to an aqueous acrylic fast-drying agent for inks, by volume, comprising: 12-20 parts of 12%-18% solution of zinc oxide, 1-3 parts of concentrated aqueous ammonia, 12-18 parts of deionized water, and 65-70 parts of an aqueous acrylic emulsion; wherein the $T_g$ of the acrylic emulsion is from −30° C. to −50° C. Such aqueous agent is suitable for applying on plastic substrates to form thin films with thickness typically less than 500 μm, and then dries at relatively low temperature, e.g., 40-50° C.

Therefore, there is a need to develop an aqueous coating composition having long pot life and, after high-temperature curing, providing thick coatings made therefrom, even with a thickness of 2 mm or more, with good adhesion to a substrate.

SUMMARY OF THE INVENTION

The present invention provides a novel aqueous coating composition by combining a specific binder with a zinc ammonia complex solution and a filler at a specific ratio. The aqueous coating composition has a pot life sufficient long for handling e.g., at least 3 hours at room temperature (20-25° C.). The aqueous coting composition of the present invention can be cured at a temperature of 70° C. or higher (i.e., high temperature) to form coatings with a thickness of 2 mm or more, preferably 3 mm or more. In the meanwhile, the coatings also have good adhesion to a substrate, as indicated by a pull-off strength from the substrate of 0.2 MPa or higher. The pot life and pull-off strength properties are measured according to the test methods described in the Examples section below. The method of preparing the coatings can be conducted by curing the aqueous coating composition at high temperature so as to improve manufacturing efficiency.

In a first aspect, the present invention is an aqueous coating composition comprising, (a) an aqueous polymer dispersion comprising a polymer, wherein the polymer comprises, based on the weight of the polymer,
from 2% to 8% by weight of structural units of an α, β-ethylenically unsaturated carboxylic acid monomer, and
from 0.05% to 1.8% by weight of structural units of an ethylenically unsaturated silane functional monomer;
(b) an aqueous solution of a zinc ammonia complex salt, comprising zinc ions; and
(c) from 60% to 90% by weight of a filler, based on the total weight of the aqueous coating composition;
wherein the weight ratio of the zinc ions to the polymer is in the range of 0.7% to 6%.

In a second aspect, the present invention is a process for preparing an aqueous coating composition of the first aspect. The process comprises admixing:

(a) an aqueous polymer dispersion comprising a polymer, wherein the polymer comprises, based on the weight of the polymer,
from 2% to 8% by weight of structural units of an α, β-ethylenically unsaturated carboxylic acid monomer, and
from 0.05% to 1.8% by weight of structural units of an ethylenically unsaturated silane functional monomer;
(b) an aqueous solution of a zinc ammonia complex salt, comprising zinc ions; and
(c) from 60% to 90% by weight of a filler, based on the total weight of the aqueous coating composition;
wherein the weight ratio of the zinc ions to the polymer is in the range of 0.7% to 6%.

In a third aspect, the present invention is a method of preparing a coating. The method comprises,
providing an aqueous coating composition of the first aspect,
applying to a substrate the aqueous coating composition, and
drying the applied aqueous coating composition at 70° C. or higher to form the coating with a thickness of 2 mm or more.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Aqueous dispersions or aqueous compositions mean that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(\text{calc.})} = \frac{w(M_1)}{T_g(M_1)} + \frac{w(M_2)}{T_g(M_2)},$$

wherein $T_g(\text{calc.})$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, that is, the monomer in polymerized form or polymerized monomer. For example, a structural unit of methyl methacrylate is as illustrated:

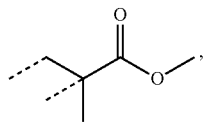

where the dotted lines represent the points of attachment of the structural unit to the polymer backbone.

The aqueous coating composition of the present invention comprises an aqueous polymer dispersion. The polymer useful in the present invention, typically an emulsion polymer, may comprise structural units of an ethylenically unsaturated silane functional monomer. The ethylenically unsaturated silane monomer may be represented by general formula (I):

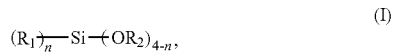

(I)

wherein $R_1$ represents a functional group selected from any substituted or unsubstituted, ethylenically unsaturated hydrocarbyl group; $R_2$ is independently selected from methyl, ethyl, propyl, isopropyl, butyl and tert-butyl; and n is an integer from 1 to 3. Examples of suitable ethylenically unsaturated silane functional monomers include alkylvinyldialkoxysilanes; (meth)acryloxyalkyltrialkoxysilanes including (meth)acryloxyethyltrimethoxysilanes and (meth)acryloxypropyltrimethoxysilanes such as gamma-methacryloxypropyltrimethoxy silane and methacryloxypropyltriethoxysilane; vinyltrialkoxysilanes such as vinyltriethoxysilane and vinyltrimethoxysilane; derivatives thereof; or combinations thereof. Commercially available ethylenically unsaturated silane functional monomers include SILQUEST A-174, A-171, A-151, A-2171 and A-172E, and Coatosil-1706, Coatosil-1757 and Y-11878 silanes all available from Momentive Performance Materials, or mixtures thereof. The polymer may comprise, based on the weight of the polymer, 0.05% by weight or more, 0.1% by weight or more, 0.15% by weight or more, 0.2% by weight or more, or even 0.25% by weight or more, and at the same time, 1.8% by weight or less, 1.5% by weight or less, 1.2% by weight or less, or even 1.0% by weight or less, of structural units of the ethylenically unsaturated silane functional monomer.

The polymer useful in the present invention may also comprise structural units of one or more α, β-ethylenically unsaturated carboxylic acid monomers. Examples of suitable α, β-ethylenically unsaturated carboxylic acid monomers include monobasic acids such as (meth)acrylic acid, crotonic acid, and acyloxypropionic acid; and dibasic acid monomers such as maleic acid, fumaric acid, and itaconic acid; or mixtures thereof. Preferred α, β-ethylenically unsaturated carboxylic acid monomers include acrylic acid, methacrylic acid, or mixtures thereof. The polymer useful in the present invention may comprise, based on the weight of the polymer, 2.0% by weight or more, 2.1% by weight or more, 2.2% by weight or more, or even 2.3% by weight or more, and at the same time, 8% by weight or less, 7% by weight or less, 6% by weight or less, 5.8% by weight or less, 5.5% by weight or less, 5% by weight or less, 4.5% by weight or less, 4% by weight or less, or even 3.5% or less, of structural units of the α, β-ethylenically unsaturated carboxylic acid monomer.

The polymer useful in the present invention may further comprise one or more additional ethylenically unsaturated functional monomers that exclude the ethylenically unsaturated silane functional monomers. Such additional ethylenically unsaturated functional monomers carry at least one functional group selected from a sulfonate, sulfonic acid, or amide. Examples of suitable additional ethylenically unsaturated functional monomers include acrylamide, methacrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide, diacetoneacrylamide, sodium p-styrene sulfonate (SSS), sodium vinyl sulfonate (SVS), 2-acrylamido-2-methylpropanesulfonic acid (AMPS), salts thereof such as sodium 2-acrylamido-2-methylpropane sulfonate, or mixtures thereof. The polymer useful in the present invention may comprise, based on the weight of the polymer, from 0 to 5% by weight, from 0.5% to 4.5% by weight or more, from 1% to 4% by weight, or from 2% to 3.5% by weight, of structural units of the additional ethylenically unsaturated functional monomer.

The polymer useful in the present invention may also comprise structural units of one or more ethylenically unsaturated nonionic monomers that exclude the ethylenically unsaturated silane functional monomer or the additional ethylenically unsaturated functional monomer. The term "nonionic monomers" herein refers to monomers that do not bear an ionic charge between pH=1-14. Suitable examples of the ethylenically unsaturated nonionic monomers include, for example, alkyl esters of (meth)acrylic acids including $C_1$-$C_{18}$ and preferably $C_1$-$C_{12}$ alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxy-functional (meth)acrylic acid alkyl ester such as hydroxyethyl (meth)acrylate and hydroxypropyl (meth)acrylate; (meth)acrylonitrile; styrene and substituted styrenes; butadiene; ethylene, propylene, α-olefins such as 1-decene; and vinyl monomers such as vinyl acetate, vinyl butyrate, vinyl chloride, vinylidene chloride, vinyl versatate and other vinyl esters; or combinations thereof. Preferred ethylenically unsaturated nonionic monomers are butyl acrylate, butyl methacrylate, methyl methacrylate, 2-ethylhexyl acrylate, decyl acrylate, lauryl acrylate, isodecyl methacrylate, lauryl methacrylate, styrene, and mixtures thereof. The polymer useful in the present invention may comprise, based on the weight of the polymer, 85% by weight or more, 87% by weight or more, 88% by weight or more, 89% by weight or more, or even 90% by weight or more, and at the same time, 98% by weight or less, 97.5% by weight or less, 97% by weight or less, 96.5% by weight or less, or even 95% by weight or less, of structural units of the ethylenically unsaturated nonionic monomers.

The polymer useful in the present invention may be obtained from a mixture of monomers comprising the ethylenically unsaturated silane functional monomer, the $\alpha,\beta$-ethylenically unsaturated carboxylic acid monomer, the ethylenically unsaturated nonionic monomer, and optionally the additional ethylenically unsaturated functional monomer.

In some preferred embodiments, the polymer comprises, based on the weight of the polymer, from 0.1% to 1% by weight of structural units of the ethylenically unsaturated silane functional monomer;
from 2% to 4% by weight of structural units of the $\alpha,\beta$-ethylenically unsaturated carboxylic acid monomers;
from 90% to 95% by weight of structural units of the ethylenically unsaturated nonionic monomers such as alkyl esters of (meth)acrylic acids; and
from 0 to 5% by weight of structural units of the additional ethylenically unsaturated functional monomer.

Total weight concentration of structural units of the monomers described above may be equal to 100%. The types and levels of the monomers described above may be chosen to provide the obtained polymer with a glass transition temperature ($T_g$) suitable for different applications. The polymer may have a $T_g$ of $-20°$ C. or more, $-15°$ C. or more, $-10°$ C. or more, $-5°$ C. or more, or even $0°$ C. or more, and at the same time, $60°$ C. or less, $50°$ C. or less, $40°$ C. or less, or even $30°$ C. or less.

The polymer useful in the present invention is typically present as an aqueous dispersion of polymer particles having an average particle size of from 10 to 500 nanometers (nm), from 50 to 400 nm, or from 80 to 300 nm. The particle size herein may be measured by a Brookhaven BI-90 Plus Particle Size Analyzer.

The polymer useful in the present invention may be prepared by free-radical polymerization, preferably emulsion polymerization, of the monomers described above. Total weight concentration of monomers for preparing the polymer is equal to 100%. The amount of structural units of each monomer in the polymer, based on the weight of the polymer is substantially the same as the dosage of such monomer based on the total weight of the monomers. The monomers may be added neat or as an emulsion in water; or added in one or more additions or continuously, linearly or nonlinearly, over the reaction period of preparing the polymer. Temperature suitable for polymerization processes may be lower than $100°$ C., in the range of from 30 to $95°$ C., or in the range of from 50 to $90°$ C. Multistage free-radical polymerization using the monomers described above can be used, which at least two stages are formed sequentially, and usually results in the formation of the multistage polymer comprising at least two polymer compositions.

In the polymerization process of preparing the polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the polymer, one or more surfactants may be used. The surfactant may be added prior to or during the polymerization of the monomers, or combinations thereof. A portion of the surfactant can also be added after the polymerization.

These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. In some preferred embodiments, the alkali metal or ammonium salts of alkyl, aryl, or alkylaryl sulfates surfactant are used. The surfactant used is usually from 0.1% to 10% by weight, preferably from 0.2% to 3% by weight, based on the total weight of monomers used for preparing the polymer.

After completing the polymerization process of the monomers, the obtained aqueous polymer dispersion may be neutralized by one or more bases to a pH value, for example, at least 7, from 7 to 10, or from 8 to 9. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

In addition to the aqueous polymer dispersion, the aqueous coating composition of the present invention further comprises an aqueous solution of one or more zinc ammonia complex salts. The zinc ammonia complex salt is water-soluble. The zinc ammonia complex salt may be selected from zinc ammonium bicarbonate, zinc ammonium nitrate, zinc ammonium acetate, or mixtures thereof. Zinc ammonia carbonate is preferred. The zinc ammonia complex salt can be prepared by mixing one or more zinc salts and/or zinc oxides, ammonia, and optionally a water-soluble carbonic acid salt such as ammonium bicarbonate. Ammonia is added in a sufficient amount to provide the aqueous solution of the zinc ammonia complex salt with a pH above about 9, preferably above 9.5, and in the presence of excess equivalents of ammonia to form a zinc ammonia complex. The zinc salt can be zinc carbonate, zinc acetate, zinc chloride, zinc nitrate, or mixtures thereof. The aqueous solution of the zinc ammonia complex salt comprises zinc ions and ammonium ions. The aqueous solution of the zinc ammonia complex salt may be present in an amount to ensure the weight ratio of the zinc ions to the polymer in an amount of 0.7% or more, 0.8% or more, 0.9% or more, 1.0% or more, 1.2% or more, or even 1.5% or more, and at the same time, 6% or less, 5.5% or less, 5% or less, 4.5% or less, 4% or less, 3.5% or less, or even 3% or less.

The aqueous coating composition of the present invention further comprises one or more fillers. The filler may have a sieve particle size ranging from 90 to 600 μm or from 120 to 500 μm. The sieve particle size may be measured according to the GB/T 5330-2003 method. Examples of suitable fillers include sand, $CaCO_3$, $SiO_2$, calcium carbonate, clay, calcium sulfate, aluminosilicates, silicates, zeolites, mica, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may comprise, based on the total weight of the aqueous coating composition, from 60% to 90% by weight, from 65% to 85% by weight, from 70% to 80% by weight, of the filler.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, based on the total dry weight of the aqueous coating composition, generally in an amount of from 0 to 0.5% by weight, from 0.01% to 0.2% by weight, or from 0.03% to 0.1% by weight.

The aqueous coating composition of the present invention may further comprise one or more thickeners. The thickeners may include polyvinyl alcohol (PVA), acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferably, the thickener is a hydrophobically-modified hydroxy ethyl cellulose (HMHEC). The thickener may be present, based on the total dry weight of the aqueous coating composition, generally in an amount of from 0 to 2% by weight, from 0.1% to 1% by weight, or from 0.3% to 0.8% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The wetting agent may be present, based on the total dry weight of the aqueous coating composition, in an amount of from 0 to 0.5% by weight, from 0.1% to 0.3% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The coalescent may be present, based on the total dry weight of the aqueous coating composition, in an amount of from 0 to 5% by weight, from 0.5% to 3% by weight, or from 1% to 2% by weight.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, thixotropic agents, adhesion promoters, and grind vehicles. When present, these additives may be present in a combined amount of from 0 to 1% by weight, from 0.1% to 0.6% by weight, or from 0.3% to 0.5% by weight, based on the total weight of the aqueous coating composition.

The aqueous coating composition of the present invention can be prepared by admixing the aqueous polymer dispersion, the aqueous solution of a zinc ammonia complex salt, and the filler. In some embodiments, the aqueous coating composition is prepared by admixing the aqueous polymer dispersion, the aqueous solution of a zinc ammonia complex salt, and other optional components such as the rheology modifier and the defoamer to form a pre-mixture, followed by adding the filler into the pre-mixture with to get a homogenous aqueous coating composition, preferably with stirring. The aqueous polymer dispersion and the aqueous solution of a zinc ammonium complex salt are usually supplied in a two-component package and mixed upon application.

The aqueous coating composition of the present invention can be formed prior to apply the aqueous coating composition to a substrate. The aqueous coating composition, upon mixing components in the aqueous coating composition, has a pot life sufficient long to enable workers handling on-site, for example, the aqueous coating composition is stable for 3 hours or longer, 5 hours or longer, 10 hours or longer, 15 hours or longer, 24 hours or longer, 3 days or longer, or even 1 week or longer at 25° C. The aqueous coating composition is also suitable to dry at a high temperature, e.g., at 70° C. or more, while still providing coatings with thickness of 2 mm or more made therefrom with good adhesion to a substrate, as indicated by a pull-off strength of 0.2 MPa or higher, 0.25 MPa or higher, 0.3 MPa or higher, 0.35 MPa or higher, 0.40 MPa or higher, or even 0.45 MPa or higher, from a substrate, preferably a cement substrate. The coatings may also have good water resistance. The pot life, pull-off strength, and water resistance may be measured according to the test methods described in the Examples section below.

The present invention also provides a method of preparing a coating, comprising, providing the aqueous coating composition, applying the aqueous coating composition to a substrate, and drying the applied coating composition at 70° C. or higher to form the coating with a thickness of 2 mm or more or 3 mm or more, preferably from 2 to 5 mm.

The coating may have a pull-off strength to the substrate of 0.2 MPa or higher or 0.25 MPa or higher at room temperature, as measured according to the test method described in the Examples section below. The aqueous coating composition can be applied to, and adhered to, various substrates including, for example, wood, metals, plastics, foams, stones, elastomeric substrates, fabrics, concrete, and cementious substrates such as cellulose fiber cement sheets. The coating can be a part of a prefabricated finishing system. The aqueous coating composition can dry, or allow to dry, to form a film (this is, coating) at high temperature, for example, 70° C. or higher, 80° C. or higher, 90° C. or higher, 100° C. or higher, 110° C. or higher, or even 120° C. or higher. The aqueous coating composition can be applied to a substrate by incumbent means including brushing, rolling and spraying. The aqueous coating composition is suitable for various applications such as Exterior Insulation and Finish Systems (EIFS), roof mastic, prefabricated insulation and finish systems (PRIFS), architectural coatings, civil engineering coatings, or liquid applied sound damping coatings (LASD). The coating composition is particularly suitable for preparing prefabricated finishing systems, e.g., PRIFS. The aqueous coating composition can be used alone, or in combination with other coatings to form multi-layer coatings. For example, a multi-layer coating may comprise the coating composition of the present invention as a middle coat.

EXAMPLES

Some embodiments of the invention will now be described in the following Examples, wherein all parts and percentages are by weight unless otherwise specified.

POLYSTEP P-12A ("P-12A") surfactant, available from Stepan, is polyethylene glycol monotridecyl ether phosphate.

2-Ethylhexyl acrylate ("EHA"), methyl methacrylate ("MMA"), methacrylic acid ("MAA"), and ammonium persulfate ("APS") are all available from Sinoreagent Group (China).

SILQUEST A-174 ("A-174") silane, available from Momentive Performance Materials, is gamma-methacryloxypropyltrimethoxy silane.

SILQUEST A-187 ("A-187") silane, available from Momentive Performance Materials, is gamma-glycidoxypropyltrimethoxysilane.

Ammonia, ammonium bicarbonate, tert-butyl hydroperoxide ("t-BHP"), and isoascorbic acid ("IAA") are all available from Shanghai Chemical Reagent Co., Ltd.

NATROSOL 250HBR ("250HBR") rheology modifier is available from Ashland.

FOAMASTER NXZ, available from BASF, is used as a defoamer.

TEXANOL ester alcohol, available from Eastman Chemical, is used as a coalescent.

AMP-95, available from Angus Chemical Company, is used as a neutralizer.

ACRYSOL TT-935, available from The Dow Chemical Company, is used as a rheology modifier.

Propylene glycol is available from The Dow Chemical Company.

Sand has a sieve particle size of from 90 to 600 μm.

The following standard analytical equipment and methods are used in the Examples.

Pull-Off Strength

A paint formulation was applied on a substrate (cellulose fiber cement sheets, autoclaved) with a wet film thickness of 3 mm. The coated substrate was then dried in an oven at 80° C. for 1 hour till the resultant paint film was fully cured, as indicated by the water content of the paint film less than 5% as measured by a moisture meter. The obtained dry paint film was evaluated for pull-off strength using a tensile machine (Haftprufsystem HP1000, bond strength testing system) at room temperature in accordance with ISO 4624. A paint film having a pull-off strength of 0.2 MPa or higher indicates that the paint film has good adhesion to the substrate. Otherwise, if the pull-off strength is less than 0.2 MPa, the paint film has poor adhesion to the substrate.

Measurement of Zn Ions 0.5 gram (g) of the sample, to nearest 0.0001 g, was weighed and added, into a digestion vessel. 5 ml concentrate nitric acid was added. The vessel was then heated on a hot plate slowly until all residuals dissolved. The resultant solution was diluted with deionized (DI) water to 50 mL. 1 mL solution was taken out and further diluted with DI water to 100 mL, and then measured with an inductively coupled plasma (ICP) spectrometer.

Zn standard solutions were prepared with concentrations of 0, 1, 2, 5, 10 ppm.

Instrument conditions: Spectrometer—Perkin Elmer Optima 5300DV; RF power—1.3 kW; Plasma view—Axial; and wavelength for test Zn ions—206.2 nm. The instrument was warmed up for 4 hours prior to the testing.

Water Resistance Test

A paint formulation was applied on a substrate (cellulose fiber cement sheets, autoclaved) with a wet film thickness of 3 mm. Then, the coated substrate was then then dried in an oven at 80° C. for 1 hour till the resultant paint film was fully cured, as indicated by the water content of the paint film less than 5% as measured by a moisture meter. The obtained dry paint film was half dipped in distilled water at room temperature. The surface of the paint film dipped in water was monitored constantly up to 7 days and observed visually. If the surface of the paint film, after 7 days, shows no whitening, blister, cracking, or peeling off from the substrate, it indicates that the paint film has good water resistance. Slightly surface color change between the dipped part and the non-dipped part is acceptable.

Pot Life

The pot life of a paint formulation was evaluated based on changes of the pull-off strength of such paint formulation to a substrate before and after storage for a certain period of time at room temperature.

The paint formulation upon mixing all components was first formed into a paint film, according to the same procedure as described in the pull-off strength test above, and the pull-off strength of the paint film was measured and recorded as Pull-off-strength$_{(Initial)}$.

Then, the same paint formulation was stored at room temperature for a certain time (t) and the pull-off strength of the paint films made therefrom was measured and recorded as Pull-off-strength (t). The longest time period, when the change of the pull-off strength (i.e., Pull-off-strength$_{(Initial)}$—Pull-off-strength$_{(t)}$) is less than 20% of Pull-off-strength$_{(Initial)}$, is recorded as the pot life.

Preparation of Aqueous Zinc Ammonia Complex Solution 120 g of ammonium bicarbonate (NH$_4$HCO$_3$) were added in a beaker with 610 g of water and 190 g of ammonia (NH$_3$H$_2$O concentration: 25-28%). 80 g of zinc oxide (ZnO) was added into the above resultant solution. The resultant mixture was mixed with continuous agitation for about 20 minutes until zinc oxide dissolved, thus forming the zinc ammonia complex solution.

The aqueous polymer dispersions (i.e., binders) were prepared as follows,

Synthesis of Binder 1

A monomer emulsion was prepared by mixing 538 g of DI water, 17 g of POLYSTEP P-12A (25% active), 770 g of EHA, 615 g of MMA, 36 g of MAA, and 4.25 g of A-174 silane.

A one gallon stirred reactor was charged with 870 g of DI water, 71 g of P-12A (25% active) as a kettle soap and 2.42 g of ammonia. After the reaction content was heated to 95° C., 88 g of the monomer emulsion was added, followed by a rinse of 20 g of DI water. Immediately thereafter, a solution of 4.14 g of ammonium bicarbonate in 20 g of DI water and 4.262 g of APS in 20 g of DI water was added. The remaining monomer emulsion was added to the reactor over 90 minutes while maintaining a temperature of 88° C. After completion of the reaction, 23 g of 7% t-BHP and 25 g of 3% IAA were fed into the reactor during one hour. 14 g of 28% ammonia solution was added as a neutralizer. The resulting polymer latex was then cooled to room temperature.

Synthesis of Binder 2

The Binder 2 was prepared according to the same procedure as preparing the Binder 1 above, except that the monomer emulsion used in preparing the Binder 2 was prepared by mixing 538 g of DI water, 17 g of P-12A (25% active), 764.7 g of EHA, 628 g of MMA, 25.9 g of MAA, and 4.25 g of A-174 silane.

Synthesis of Binder 3

The Binder 3 was prepared according to the same procedure as preparing the Binder 1 above, except that the monomer emulsion used in preparing the Binder 3 was prepared by mixing 538 g of DI water, 17 g of P-12A (25% active), 790 g of EHA, 542 g of MMA, 86.4 g of MAA, and 4.25 g of A-174 silane.

Synthesis of Binder 4

The Binder 4 was prepared according to the same procedure as preparing the Binder 1 above, except that the monomer emulsion and the dosage of P-12A surfactant directly charged into the reactor were different. The monomer emulsion used for preparing the Binder 4 was prepared by mixing 538 g of DI water, 17 g of P-12A (25% active), 768.8 g of EHA, 621 g of MMA, 28.8 g of MAA, and 4.25 g of A-174 silane. 5.67 g of P-12A (25% active) were directly charged into the reactor as the kettle soap.

Synthesis of Binder 5

The Binder 5 was prepared according to the same procedure as preparing the Binder 1 above, except that the monomer emulsion used in preparing the Binder 5 was prepared by mixing 538 g of DI water, 17 g of P-12A (25% active), 754.6 g of EHA, 603.8 g of MMA, 36 g of MAA, and 28.36 g of A-174 silane.

Synthesis of Binder 6

The Binder 6 was prepared according to the same procedure as preparing the Binder 1 above, except that the monomer emulsion used in preparing the Binder 6 was prepared by mixing 538 g of DI water, 17 g of P-12A (25% active), 766 g of EHA, 621 g of MMA, and 36 g of MAA.

Synthesis of Binder 7

The Binder 7 was obtained by first preparing the Binder 6 as described above, then adding 4.25 g of A-187 silane into the reactor to give the Binder 7.

Synthesis of Binder 8

The Binder 8 was prepared according to the same procedure as preparing the Binder 1 above, except that the monomer emulsion used in preparing the Binder 8 was prepared by mixing 538 g of DI water, 17 g of P-12A (25% active), 772 g of EHA, 597 g of MMA, and 50.4 g of MAA, and 4.25 g of A-174 silane.

Synthesis of Binder 9

The Binder 9 was prepared according to the same procedure as preparing the Binder 1 above, except that the monomer emulsion used in preparing the Binder 9 was prepared by mixing 538 g of DI water, 17 g of P-12A (25% active), 779 g of EHA, 568.5 g of MMA, and 72 g of MAA, and 4.25 g of A-174 silane.

Properties of the above obtained binders are given in Table 1.

TABLE 1

Properties of Binders

| Aqueous polymer dispersion | Polymer Composition* | pH | Solids content, by weight | Average particle diameter |
|---|---|---|---|---|
| Binder 1 | 43.2MMA/54EHA/2.5MAA/0.3A-174 | 8.0 | 45% | 90 nm |
| Binder 2 | 44.2MMA/53.7EHA/1.8MAA/0.3A-174 | 8.4 | 45.35% | 90 nm |
| Binder 3 | 38.2MMA/55.5EHA/6MAA/0.3A-174 | 8.25 | 39.74% | 105 nm |
| Binder 4 | 43.7MMA/54EHA/2MAA/0.3A-174 | 8.15 | 45.57% | 132 nm |
| Binder 5 | 42.5MMA/53EHA/2.5MAA/2A-174 | 8.15 | 45.03% | 84 nm |
| Binder 6 | 43.7MMA/53.8EHA/2.5MAA | 7.97 | 46% | 90 nm |
| Binder 7 | 43.7MMA/53.8EHA/2.5MAA | 7.97 | 46% | 90 nm |
| Binder 8 | 42MMA/54.2EHA/3.5MAA/0.3A-174 | 8.30 | 45.10% | 96 nm |
| Binder 9 | 40MMA/54.7EHA/5MAA/0.3A-174 | 8.37 | 45.5% | 93 nm |

*Percentage by weight based on the total weight of monomers

Examples (Exs) 1-9

The above obtained binders were used for preparing paint formulations (i.e., coating compositions) of Exs 1-9, based on formulations given in Table 2. Water, the binder and other ingredients of each paint formulation were mixed using a conventional lab mixer. The sand was added into the resultant mixture at last. The obtained paint formulations were evaluated according to the test methods described above and results are given in Table 2.

Comparative (Comp) Exs A-G

Paint formulations of Comp Exs A-G comprising the above obtained binders were prepared based on formulations described in Table 3. Water, the binder and other ingredients of each paint formulation were mixed using a conventional lab mixer. The sand was added into the resultant mixture at last. The obtained paint formulations were evaluated according to the test methods described above and results are given in Table 3.

As shown in Table 2, the paint formulations of the present invention all had long pot life, e.g., more than 3 hours or even more than 16 hours. The paint formulations of Exs 1-9, upon drying at 80° C. for 1 hour also provided a pull-off strength of the paint films made therefrom of 0.45 MPa or higher. Moreover, the paint films of Exs 1-9 all demonstrated good water resistance as indicated by no whitening, blister or cracking on the surface, or peeling off from the substrate after dipping in water for 7 days.

In contrast, as shown in Table 3, the binders that didn't comprise structural units of A-174 silane provided the paint formulations (Comp Exs E and F) with very short pot life (less than 0.3 hour). The binder obtained from 2% A-174 silane provided paint films made therefrom with poor water resistance (Comp Ex G). The binders comprising 1.8% of structural units of MAA also provided the paint formulation (Comp Ex C) with a pot life less than 0.3 hour. The paint formulations with weight ratios of zinc ions to binder solids of 0.33%, 0.66%, or 6.7% (Comp Exs A, B and D), all provided paint films with unacceptable low pull-off strength (<0.2 MPa) and poor water resistance.

TABLE 2

Coating Compositions

|  | Ex 1 | Ex 2 | Ex 3 | Ex 4 | Ex 5 | Ex 6 | Ex 7 | Ex 8 | Ex 9 |
|---|---|---|---|---|---|---|---|---|---|
| Water (g) | 32.55 | 32.55 | 25 | 25 | 25 | 25 | 40 | 40 | 15 |
| Binder Dosage (g) | 60 | 60 | 60 | 60 | 60 | 60 | 60 | 60 | 60 |
| Binder Type | Binder 1 | Binder 1 | Binder 8 | Binder 1 | Binder 1 | Binder 1 | Binder 9 | Binder 4 | Binder 3 |
| 250HBR (g) | 0.65 | 0.65 | 0.5 | 0.5 | 0.5 | 0.5 | 0.5 | 0.5 | 0.5 |
| Propylene glycol (g) | 2 | 2 | 2.5 | 2.5 | 2.5 | 2.5 | 2.5 | 2.5 | 2.5 |
| FOAMASTER NXZ (g) | 0.3 | 0.3 | 0.5 | 0.5 | 0.5 | 0.5 | 0.5 | 0.5 | 0.5 |
| TEXANOL (g) | 3 | 3 | 3 | 3 | 3 | 3 | 3 | 3 | 3 |
| AMP-95 | 0.5 | 0.5 | 0.5 | 0.5 | 0.5 | 0.5 | 0.5 | 0.5 | 0.5 |
| ACRYSOL TT-935 (g) | 1 | 1 | 1 | 1 | 1 | 1 | 1 | 1 | 1 |
| Sand (g) | 261.8 | 261.8 | 261.8 | 261.8 | 261.8 | 261.8 | 261.8 | 261.8 | 261.8 |
| Zinc ammonia complex solution (g) | 3.6 | 4.8 | 7.2 | 7.2 | 9.6 | 12 | 18 | 7.2 | 7.2 |
| Total (g) | 361.9 | 361.9 | 362.0 | 362.0 | 364.4 | 366.8 | 387.8 | 377.0 | 352.0 |
| Zinc ion: binder (solid: solid) | 0.99% | 1.31% | 1.98% | 1.98% | 2.64% | 3.30% | 4.95% | 1.98% | 1.98% |
| Properties |  |  |  |  |  |  |  |  |  |
| Pull-off strength (MPa) | 0.52 | 0.75 | 0.95 | 0.47 | 0.68 | 0.96 | 0.58 | 0.66 | 0.45 |
| Water resistance (7 day) | No change | No change | No change | No change | No change | No change | No change | No change | No change |
| Pot life (hours) | >16 | >16 | >3 | >16 | >16 | >16 | >3 | >3 | >3 |

TABLE 3

Comparative Coating Compositions

|  | Comp Ex A | Comp Ex B | Comp Ex C | Comp Ex D | Comp Ex E | Comp Ex F | Comp Ex G |
|---|---|---|---|---|---|---|---|
| Water (g) | 32.55 | 32.55 | 25 | 25 | 40 | 25 | 25 |
| Binder dosage (g) | 60 | 60 | 60 | 60 | 60 | 60 | 60 |
| Binder Type | Binder 1 | Binder 1 | Binder 2 | Binder 1 | Binder 6 | Binder 7 | Binder 5 |
| A-187 silane (g) |  |  |  |  |  |  |  |
| 250HBR (g) | 0.65 | 0.65 | 0.5 | 0.5 | 0.5 | 0.5 | 0.5 |
| Propylene glycol (g) | 2 | 2 | 2.5 | 2.5 | 2.5 | 2.5 | 2.5 |
| FOAMASTER NXZ (g) | 0.3 | 0.3 | 0.5 | 0.5 | 0.5 | 0.5 | 0.5 |
| TEXANOL (g) | 3 | 3 | 3 | 3 | 3 | 3 | 3 |
| AMP-95 (g) | 0.5 | 0.5 | 0.5 | 0.5 | 0.5 | 0.5 | 0.5 |
| ACRYSOL TT-935 (g) | 1 | 1 | 1 | 1 | 1 | 1 | 1 |
| Sand (g) | 261.8 | 261.8 | 261.8 | 261.8 | 261.8 | 261.8 | 261.8 |
| Zinc ammonia complex solution (g) | 1.2 | 2.4 | 7.2 | 24.6 | 7.2 | 7.2 | 7.2 |
| Total (g) | 361.9 | 361.9 | 362.0 | 379.4 | 377.0 | 362.1 | 362.0 |
| Zinc ion: binder (solid: solid) | 0.33% | 0.66% | 1.98% | 6.70% | 1.98% | 1.98% | 1.98% |
| Properties |  |  |  |  |  |  |  |
| Pull-off strength (MPa) | 0.1 | 0.09 | n.d. | 0.11 | n.d. | n.d. | n.d. |
| Water resistance (7 day) | blister | blister | n.d. | blister | n.d. | n.d. | cracking |
| Pot life (hours) | >16 | >16 | <0.3 | >3 | <0.3 | <0.3 | >3 |

What is claimed is:

1. An aqueous coating composition, comprising,
   (a) an aqueous polymer dispersion comprising a polymer, wherein the polymer comprises, based on the weight of the polymer, from 2% to 8% by weight of structural units of α, β-ethylenically unsaturated carboxylic acid monomer, and from 0.05% to 1.8% by weight of structural units of an ethylenically unsaturated silane functional monomer;
   (b) an aqueous solution of a zinc ammonia complex salt, comprising zinc ions; and
   (c) from 65% to 90% by weight of a filler, based on the total weight of the aqueous coating composition;
   wherein the weight ratio of the zinc ions to the polymer is in the range of 0.7% to 6%.

2. The aqueous coating composition of claim 1, wherein the ethylenically unsaturated silane functional monomer is selected from (meth)acryloxyethyltrimethoxysilanes, (meth)acryloxypropyltrimethoxysilanes, vinyltriethoxysilane, vinyltrimethoxysilane, derivatives thereof, or combinations thereof.

3. The aqueous coating composition of claim 1, wherein the polymer comprises, based on the weight of the polymer, from 0.1% to 1% by weight of structural units of the ethylenically unsaturated silane functional monomer.

4. The aqueous coating composition of claim 1, wherein the weight ratio of the zinc ions to the polymer is in the range of from 1.5% to 3%.

5. The aqueous coating composition of claim 1, wherein the zinc ammonia complex salt is selected from zinc ammonium bicarbonate, zinc ammonium nitrate, zinc ammonium acetate, or mixtures thereof.

6. The aqueous coating composition of claim 1, wherein the polymer comprises, based on the weight of the polymer, from 2% to 4.54% by weight of structural units of the α, β-ethylenically unsaturated carboxylic acid monomer.

7. The aqueous coating composition of claim 1, wherein the filler has a sieve particle size of from 90 to 600 μm.

8. A process for preparing an aqueous coating composition of claim 1, comprising admixing:
   (a) an aqueous polymer dispersion comprising a polymer, wherein the polymer comprises, based on the weight of the polymer,
   from 2% to 8% by weight of structural units of an α, β-ethylenically unsaturated carboxylic acid monomer, and
   from 0.05% to 1.8% by weight of structural units of an ethylenically unsaturated silane functional monomer;
   (b) an aqueous solution of a zinc ammonia complex salt, comprising zinc ions; and
   (c) from 65% to 90% by weight of a filler, based on the total weight of the aqueous coating composition;
   wherein the weight ratio of the zinc ions to the polymer is in the range of 0.7% to 6%.

9. The process of claim 8, wherein the aqueous solution of a zinc ammonia complex salt is obtained by mixing ammonia, a zinc salt or zinc oxide, and optionally a water-soluble carbonic acid salt.

10. A method of preparing a coating, comprising, providing an
    aqueous coating composition of claim 1,
    applying to a substrate the aqueous coating composition, and
    drying the applied aqueous coating composition at 70° C. or higher to form the coating with a thickness of 2 mm or more.

* * * * *